United States Patent [19]
Ohtsuki

[11] Patent Number: 6,078,267
[45] Date of Patent: Jun. 20, 2000

[54] METHOD OF DETERMINING THE NUMBER OF TIMES A PAGER HAS BEEN PAGED AND A PAGER HAVING SUCH A FUNCTION

[75] Inventor: Michihito Ohtsuki, Shizuoka, Japan

[73] Assignee: NEC Corporation, Tokyo, Japan

[21] Appl. No.: 08/923,985

[22] Filed: Sep. 5, 1997

[30] Foreign Application Priority Data

Sep. 6, 1996 [JP] Japan ................................. 8-237079

[51] Int. Cl.[7] .................................................. G08B 5/22
[52] U.S. Cl. .............................. 340/825.44; 340/825.47; 340/825.2; 455/406; 455/407; 455/31.1; 455/31.2; 455/31.3; 370/394
[58] Field of Search .................... 340/825.44, 825.47, 340/825.2; 455/405, 406, 407, 31.1, 31.2, 31.3; 370/394

[56] References Cited

U.S. PATENT DOCUMENTS

| | | | |
|---|---|---|---|
| 5,086,428 | 2/1992 | Perlman et al. | 370/394 |
| 5,151,899 | 9/1992 | Thomas et al. | 370/394 |
| 5,682,148 | 10/1997 | Gaskill et al. | 340/825.2 |
| 5,796,790 | 8/1998 | Brunner | 455/406 |

*Primary Examiner*—Brian Zimmerman
*Assistant Examiner*—Yves Dalencourt
*Attorney, Agent, or Firm*—Sughrue, Mion, Zinn, Macpeak & Seas, PLLC

[57] ABSTRACT

In order to estimate the number of message transmissions dispatched to a radio pager wherein messages transmitted are sequentially numbered, a transmitted signal is acquired which has been found to be directed to the pager. Thereafter, a check is made to determine if a message number included in the transmitted signal is detected. If the message number is detected, the message number detected is stored in a memory. The number of acquired transmitted signals is incremented except where the message number detected is discontinuous with a previous message number which was detected immediately before the detection of the instant message. Then the number of message transmissions is estimated or determined using the number of acquired transmitted signals, the message number detected stored in the above, and the above mentioned previous message number.

10 Claims, 4 Drawing Sheets

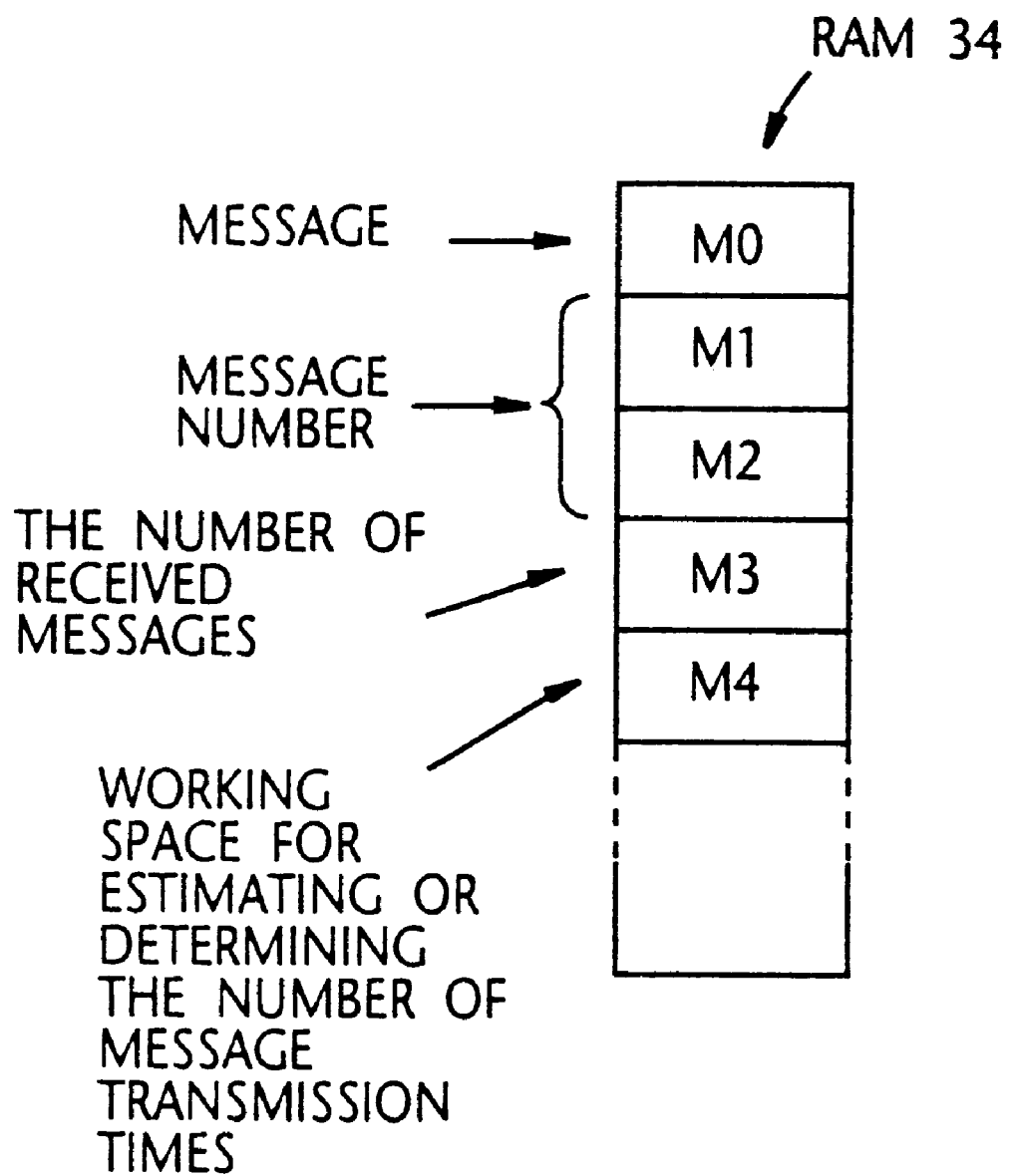

FIG. 3

| PAGING NO. | RECEIVED PAGING NO. ↓ | M1 | M2 | M3 | M4 |
|---|---|---|---|---|---|
| ⋮ | | | | | |
| 212 | * | 0 | 0 | 1 | 0 |
| 213 | * | 0 | 0 | 2 | 0 |
| 214 | * | 0 | 0 | 3 | 0 |
| 215 | [215] | 215 | 0 | 4 | M3+1 = 4 |
| 216 | [216] | 215 | 216 | 5 | M3+1 = 5 |
| 217 | [217] | 217 | 216 | 6 | M3+1 = 6 |
| 218 | * | 217 | 216 | 7 | 6 |
| 219 | ● | 217 | 216 | 7 | 6 |
| 220 | ● | 217 | 216 | 7 | 6 |
| 221 | [221] | 217 | 221 | M4 + \|M1−M2\| = 10 | (M3 → M4) |
| 222 | ● | 217 | 221 | 10 | 10 |
| 223 | * | 217 | 221 | 11 | 10 |
| 224 | ● | 217 | 221 | 11 | 10 |
| 225 | [225] | 225 | 221 | M4 + \|M1−M2\| = 14 | (M3 → M4) |
| 226 | [226] | 225 | 226 | 15 | M3+1 = 15 |
| ⋮ | | | | | |

\* : DATA RECEIVED, BUT MESSAGE NO. WAS NOT DETECTED

● : DATA WAS NOT RECEIVED

[n] : DETECTED MESSAGE NO.

METHOD OF DETERMINING THE NUMBER OF TIMES A PAGER HAS BEEN PAGED AND A PAGER HAVING SUCH A FUNCTION

BACKGROUND OF THE INVENTION

1. Field of the Invention

The present invention relates generally to a radio pager, and more specifically to a method of determining or estimating, within a pager, the number of times paging services have been implemented by a calling station. Still more specifically, the present invention relates to a pager which can determine or estimate the number of paging service times (viz., the number of message transmissions).

2. Description of the Related Art

A paging service company typically charges each subscriber a fixed fee for their services irrespective of the number of paging services during a predetermined time period (e.g., one month). However, some paging service companies intend to charge the subscriber depending on the number of messages which are transmitted (viz., the number of pagings). In such a case, it is desirable if the subscriber is able to determine or estimate the service fee without inquiring the fee from the company. According to Japanese Laid-open Patent Application No. 1-264056, a predetermined number is counted down each time the subscriber's pager receives a message. When the countdown reaches zero, the pager alerts the subscriber.

However, it is often the case that the pager is located in such an area as the paging signal does not reach the pager due to weak signal strength. Accordingly, with this conventional technique, it is very difficult for the subscriber to exactly determine the number of pagings, based on which the company will charge the subscriber, It Is therefore highly desirable if the subscriber is able to determine the service fee at the pager.

SUMMARY OF THE INVENTION

It is therefore an object of the present to provide a method of estimating or determining, at the pager, the number of messages which have been transmitted.

Another object of the present invention is to provide a pager which has a function of estimating or determining the number of messages which have been transmitted.

In brief, these objects are achieved by techniques wherein, in order to estimate the number of message transmissions at a radio pager wherein messages transmitted are sequentially numbered, a transmitted signal is acquired which has been found to be directed to the pager. Thereafter, a check is made to determine if a message number included in the transmitted signal is detected. If the message number is detected, it is stored in a memory. The number of acquired transmitted signals is incremented except in the case that the message number detected is discontinuous with a message number which was detected immediately before. In this instance, the number of message transmissions is estimated or determined using the number of acquired transmitted signals, the message number of the just received message, and the message number of the previously received message.

One aspect of the present invention resides in a method of estimating the number of message transmissions at a radio pager wherein the messages transmitted are sequentially numbered, comprising the steps of: (a) acquiring a transmitted signal which has been found to be directed to the pager; (b) detecting a message number included in the transmitted signal if the message number can be detected; (c) storing the message number detected at step (b); (d) incrementing the number of acquired transmitted signals except where the message number detected at step (b) is discontinuous with a previous message number which was detected immediately before the message number detected at step (b); and (e) estimating the number of message transmissions using the number of acquired transmitted signals, the message number detected at step (b), and the previous message number.

Another aspect of the present invention resides in a pager having an estimating function for estimating the number of message transmissions, comprising: a signal acquiring circuit for acquiring a transmitted signal which has been found to be directed to the pager; first means for detecting a message number included in the transmitted signal if the message number can be detected; memory means for storing the message number detected by the first means; second means for incrementing the number of acquired transmitted signals except where the message number detected at the first means is discontinuous with a previous message number which was detected immediately before; and third means for estimating the number of message transmission times using the number of acquired transmitted signals, the message number detected by the first means, and the previous message number.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 1B is a memory map schematically showing a plurality of memory sections which are utilized in operating the pager of FIG. 1A;

FIG. 3 is a diagram showing the contents of memory sections shown in FIG. 1B while implementing the operations depicted in the flow shown in FIG. 2.

DETAILED DESCRIPTION OF THE PREFERRED EMBODIMENTS

A pager calling station associated with the present invention is such as to sequentially number each of the messages transmitted therefrom. By way of example, the sequential numbers may be cyclically used from one up to a predetermined number (e.g., ten thousand (for example)).

Figure 1A:
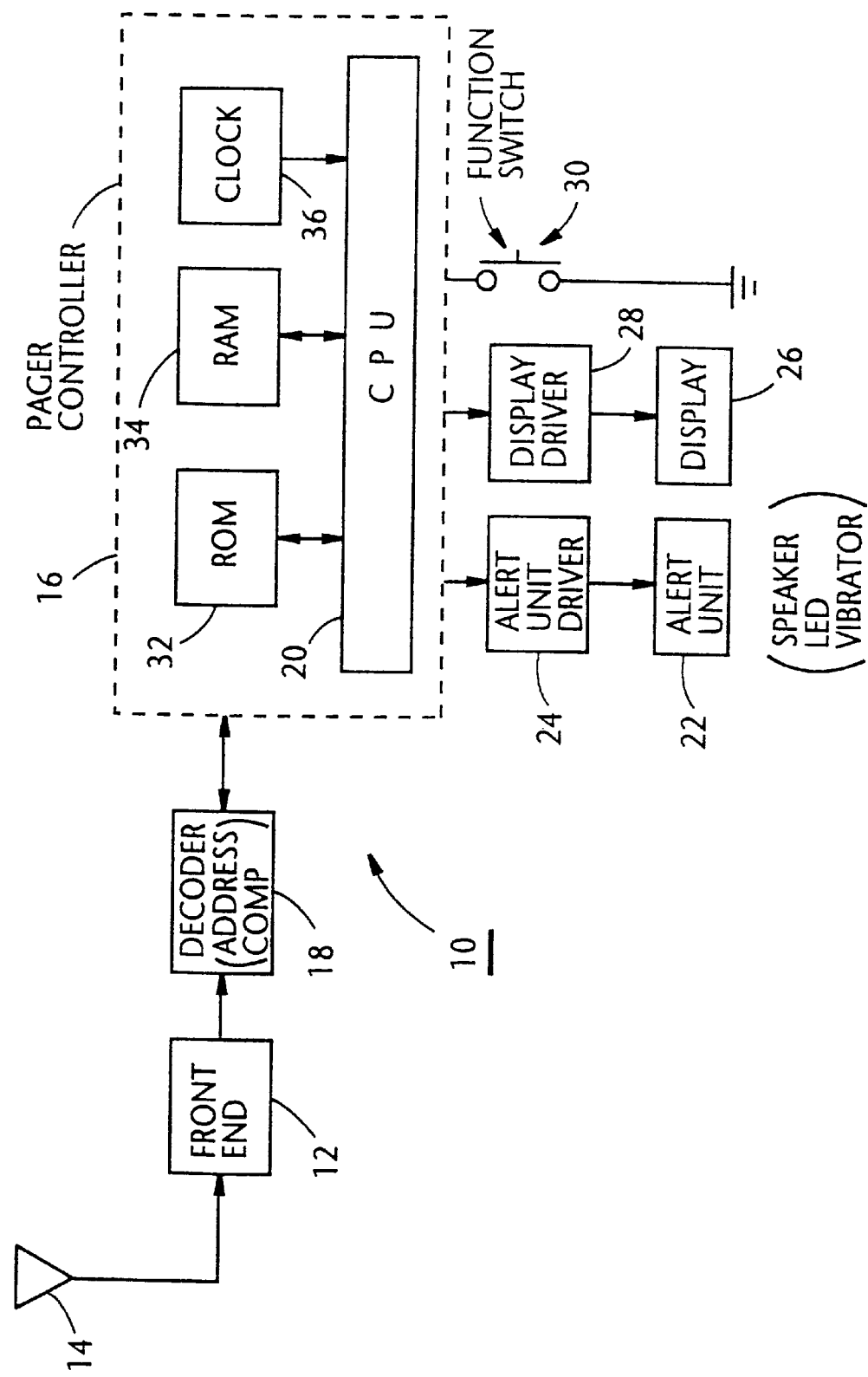
FIG. 1A is a block diagram showing an arrangement of a pager to which the present invention is applicable.

Reference is made to FIG. 1A. As shown, a front end 12 is provided for amplifying and demodulating a code-modulated carrier wave received by an antenna 14. The front end 12 is a conventional circuit arrangement comprised of a high frequency amplifier, a frequency converter, an IF (intermediate frequency) amplifier, and a discriminator. Although not shown in FIG. 1A, in order to suppress battery power consumption, it is conventional that the front end 12 is periodically energized by a plurality of preamble search pulses that are applied thereto under the control of a pager controller 16.

When the front end 12 acquires one of the preambles sequentially transmitted from a calling station (not shown). The output of the front end 12 is applied to a decoder 18 after being wave-shaped at a wave shaper (not shown). The decoder 18 searches for a preamble and a synchronization codeword preceded thereby. If the codeword is detected, the decoder 20 searches for an identifying address code by comparing the same with a subscribers unique code prestored in a ROM (read only memory) (not shown) within the decoder 18. In the event that the identifying address code coincides with the subscribers unique code, the decoder 18 supplies the pager control section 16 with data that includes the message data and the associated message number.

When the controller 16 acquires the message data and the message number, a CPU (central processing unit) 20 activates an alert unit 22 such as a speaker, an LED (light emitting diode), and a vibrator by way of an alert unit driver 24. Further, the message directed to the subscriber is exhibited on a display 26 via a display driver 28. A function switch 30 is coupled to the control section 16.

The pager control section 16 includes, in addition to the CPU 20, a ROM (read only memory) 32, a RAM (random access memory) 34, and a clock 36. The ROM 32 is previously provided with a program that controls the overall operations of the pager 10. The RAM (random access memory) 34 provides work spaces needed for pager operations, which will be discussed later in detail. The clock 36 provides the CPU 20 with the time data of months, days, and hours.

Referring to FIG. 1B a plurality of memory sections M0–M4 of the RAM 34 are schematically illustrated. The memory section M0 is for storing a message received by the pager 10. On the other hand, M1 and M2 are provided for alternately storing message numbers attached to the received messages. M3 stores the number of received messages, while M4 is a working space for estimating or determining the number of message transmission times (viz., paging times of the calling station).

Figure 2:
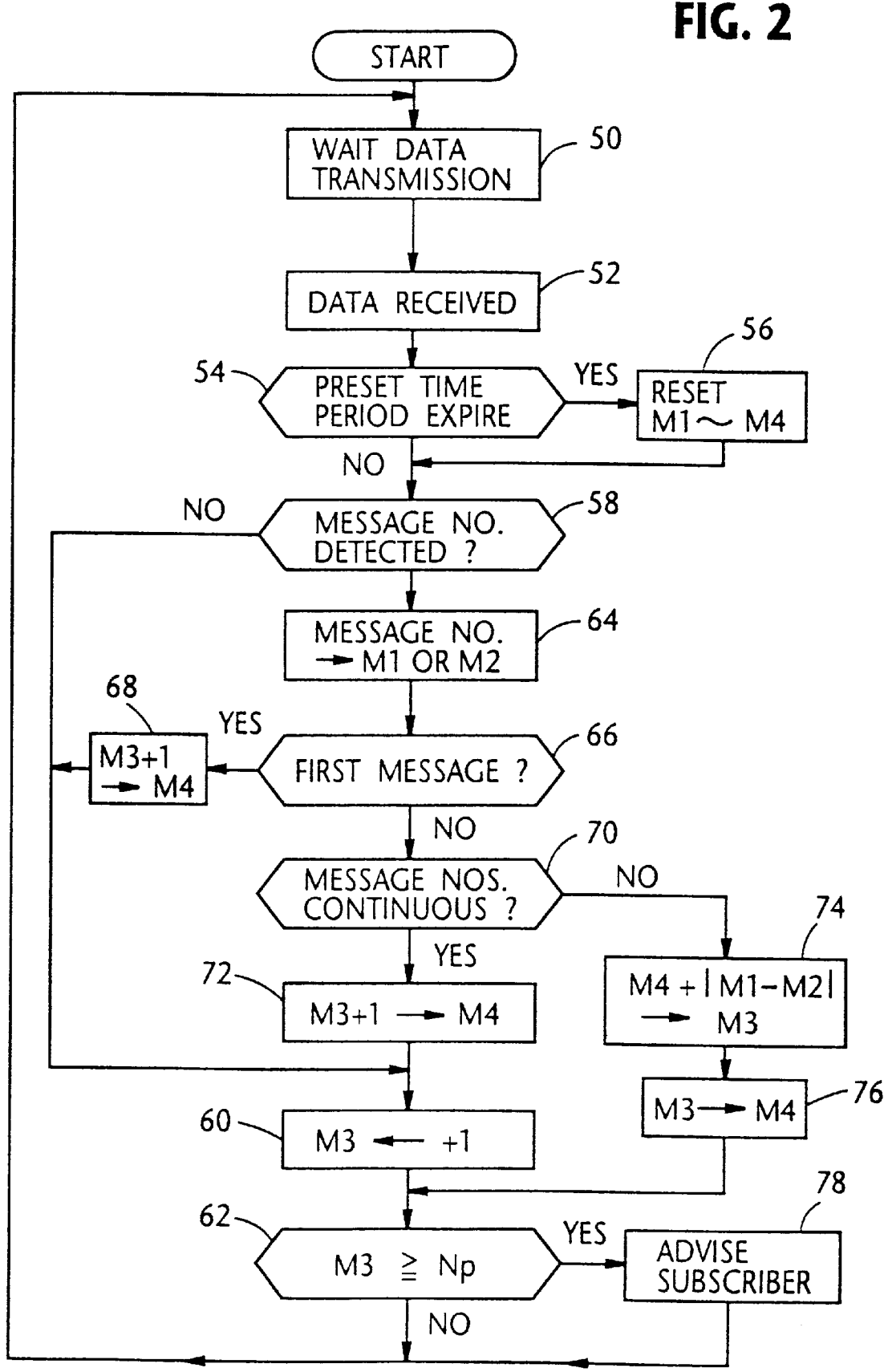
FIG. 2 is a flow chart which shows the steps which characterize the operations of a preferred embodiment of the present invention.

The operations of the pager 10 will be described with reference to FIGS. 2 and 3. A notation * in FIG. 3 denotes that the message data was received but the message number attached thereto was not detected. On the other hand, a notation ● in FIG. 3 indicates that the data itself was not received due to signal degradation during transmission. This case occurs when the pager 10 is not energized or located in an area wherein the pager is unable to receive the paging signal due to an environment of poor signal strength.

At step 50, the pager 10 is waiting for data transmission. It is assumed that the pager 10 acquires, at step 52, a message data transmitted from a calling station. In this instance, it is understood that the pager 10 has already specified that a transmitted identification address code coincided with the subscriber's unique code.

Subsequently, at step 54, a check is made to determine if a predetermined time period has expired. It may be convenient to design the pager 10 such as to cyclically check, using the clock 36, if a new month has begun. This is because it appears preferable that the subscriber is charged for the paging service every month. Of course, the present invention is not limited to such a time period. As mentioned above, the calling station attaches sequential message numbers to the messages, respectively. The sequential numbers does not start from one at each month and thus, it is not possible to determine the number of paging services during one month merely using the sequential numbers.

If the pager 10 determines that the preset time period has expired at step 54 (viz., YES), the memory sections M1–M4 are all cleared at step 56. If the answer to the inquiry at step 54 is negative, the routine goes to step 58. For the sake of simplifying the description, it is assumed that the memory sections M1–M4 are cleared at this time. As shown in FIG. 3, when M1–M4 are cleared, it is assumed that the paging number is 212.

At step 58, a check is made to determine if a message number is detected or specified. If the pager 10 fails to detect any message number that the calling station has attached to the received message, the routine proceeds to step 60 whereat the content of M3 is incremented by one. Therefore, at this stage, the content of M3 becomes "1". For the sake of simplifying the descriptions, each of M1–M4 also indicates the content of thereof. Subsequently, at step 62, a check is made to determine if M3 is equal to or greater than a predetermined number (Np). This number is previously set to a suitable paging number such as 50 merely by way of example. At this stage, since M3<Np, the routine goes back to step 50. More specifically, for example, the initial paging services up to 50 times are covered by a basic fee, after which the service fee increases stepwise each time the number of paging services reaches 50 times.

As shown in FIG. 3, it is assumed that the pager 10 continuously fails to detect any message number at each of the first three message acquisitions. Thus, the content of M3 becomes "3" with all M1, M2, and M4 remained zero.

On the other hand, at the 215-th paging operation, it is assumed that the pager 10 detects the paging No. 215 at step 58. Thus, the program goes to step 64 whereat the paging No. 215 is stored in M1. Subsequently, at step 66, a check is made to determine if the message bearing the paging No. 215 is the first one. In the instant embodiment, this message is the first one after all M1–M4 are cleared, the routine proceeds to step 68 whereat (M3+1) is written into the memory section M4 (thus, M4=4). Thereafter, M3 is incremented by one and thus assumes "4", after which the routine flows back to step 50.

At the 216-th paging operation, the pager 10 detects the paging No. 216 that is in turn stored in the memory section M2. In this case, the instant message is the second one whose paging No. has been detected and thus, the routing goes to step 70 whereat a check is made to determine if the just detected message number immediately follows the previously detected number. Since the answer to the inquiry at step 70 is affirmative, the value of M3+1 is stored, at step 72, into the memory section M4 whose value therefore becomes "5".

At the following 217-th paging operation, the pager 10 detects the paging No. 217 that is stored into the memory section M1. It is understood that the incoming paging numbers are alternately stored into M1 and M2. Thereafter, the operation similar to the above is implemented. Thus, each of the contents of M3 and M4 becomes "6".

At the 218-th paging operation, the pager fails to detect the paging No. 218 although the message itself is received. Thus, only the content of M3 is incremented by one. On the other hand, at the 219-th and 220-th paging operations, the pager 10 fails to acquire any data and accordingly, all M1–M4 remain unchanged.

At the 221-th paging operation, although the paging number is detected, the detected number is found discontinuous with respect to the lastly detected one at step 70. Thus, the routine proceeds to step 74 whereat a calculation of (M4+|M1-M2|) is implemented. In the instant stage, M4=6, M1=6 and M2=10. Therefore, M4+| M1-M2 |=10. At the following step 76,the value of M3(=10) is stored into M4, after which the routine flows back to step 50 by way of step 62. The following operations at the paging Nos. 222–226 will clearly be understood form the foregoing.

Although not shown in FIG. 3, when M3 equals or-exceeds Np before the end of the month, a message "The service fee increases thereafter" (for example) is displayed at step 78. In this case, the new service fee for up to the following 50 paging services may be displayed. At this time, it is preferable to alert the pager using the alert device such as a speaker.

It will be understood that the above disclosure is representative of only one possible embodiment of the present invention and that the concept on which the invention is based is not specifically limited thereto.

What is claimed is:

1. A method of estimating the number of message transmissions at a radio pager wherein messages transmitted are sequentially numbered, comprising the steps of:

(a) acquiring a transmitted signal which has been found to be directed to the pager;

(b) detecting a message number included in the transmitted signal if the message number can be detected;

(c) storing the message number detected at step (b);

(d) incrementing the number of acquired transmitted signals except where the message number detected at step (b) is discontinuous with a previous message number which was detected immediately before; and (e) estimating the number of message transmission times using the number of acquired transmitted signals, the message number detected at step (b), and the previous message number.

2. A method as claimed in claim 1, wherein the number of message transmissions is exhibited on a pager's display upon reaching a predetermined value.

3. A method as claimed in claim 1, wherein the step of estimating the number of message transmissions restarts when a predetermined time period expires.

4. A method as claimed in claim 3, wherein the predetermined time period is one month.

5. A method as claimed in claim 4, wherein the predetermined time period is determined using a clock that is provided in the pager.

6. A pager having a function of estimating the number of message transmissions, comprising:

a signal acquiring circuit for acquiring a transmitted signal which has been found to be directed to the pager;

first means for detecting a message number included in the transmitted signal if the message number can be detected;

memory means for storing the message number detected at said first means;

second means for incrementing the number of acquired transmitted signals except where the message number detected at said first means is discontinuous with a previous message number which was detected immediately before; and third means for estimating the number of message transmissions using the number of acquired transmitted signals, the message number detected at said first means, and the previous message number.

7. A pager as claimed in claim 6, further including a display on which the number of message transmission times is exhibited upon reaching a predetermined value.

8. A pager as claimed in claim 6, wherein estimating the number of message transmission times restarts when a predetermined time period expires.

9. A pager as claimed in claim 8, wherein the predetermined time period is one month.

10. A pager as claimed in claim 9, further comprising a clock which determines the predetermined time period.

* * * * *